(12) United States Patent
Teachman et al.

(10) Patent No.: US 12,488,671 B2
(45) Date of Patent: Dec. 2, 2025

(54) SYSTEMS AND METHODS FOR CONTEXT-AWARE ANXIETY INTERVENTIONS

(71) Applicant: The University of Virginia Patent Foundation, Charlottesville, VA (US)

(72) Inventors: Bethany A. Teachman, Charlottesville, VA (US); Laura E. Barnes, Earlysville, VA (US); Mehdi Boukhechba, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 129 days.

(21) Appl. No.: 18/241,133

(22) Filed: Aug. 31, 2023

(65) Prior Publication Data

US 2024/0071201 A1 Feb. 29, 2024

Related U.S. Application Data (60) Provisional application No. 63/402,568, filed on Aug. 31, 2022.

(51) Int. Cl.
*G08B 21/18* (2006.01)
*A61B 5/0205* (2006.01)
*A61B 5/16* (2006.01)

(52) U.S. Cl.
CPC ........ *G08B 21/182* (2013.01); *A61B 5/02055* (2013.01); *A61B 5/165* (2013.01)

(58) Field of Classification Search
None
See application file for complete search history.

(56) References Cited

U.S. PATENT DOCUMENTS

2020/0175886 A1* 6/2020 Jain .................. G16H 20/70
2023/0249599 A1* 8/2023 Nicola ................ B60N 2/56
297/284.6

* cited by examiner

*Primary Examiner* — Thomas S McCormack
(74) *Attorney, Agent, or Firm* — Knobbe Martens Olson & Bear LLP (57) ABSTRACT

An anxiety microdose intervention delivery system receives, from a plurality of biomarker sensors, a positional parameter associated with a user's position, a social parameter associated with a user's social interaction, and a set of physiological parameters associated with a user's physiological state. The system can determine, using a recommendation algorithm, that a user is in a possible state of anxiety. The system can generate, based at least in part on the determination that the user is in the possible state of anxiety, data for displaying microdose intervention content on the user device. The microdose intervention content can be configured to better manage the anxiety. The system can receive user interaction with the microdose intervention content and transmit a report of the user interaction with the intervention content.

20 Claims, 7 Drawing Sheets

SYSTEMS AND METHODS FOR CONTEXT-AWARE ANXIETY INTERVENTIONS

CROSS-REFERENCE TO RELATED APPLICATIONS

This application claims the benefit of U.S. Provisional Application No. 63/402,568, filed Aug. 31, 2022, entitled SYSTEMS AND METHODS FOR CONTEXT-AWARE ANXIETY INTERVENTIONS. The content of the aforementioned applications is hereby incorporated by reference in their entireties as if fully set forth herein. The benefit of priority to the foregoing applications is claimed under the appropriate legal basis, including, without limitation, under 35 U.S.C. § 119(e).

STATEMENT REGARDING FEDERALLY SPONSORED R&D

This invention was made with U.S. Government support under Contract Nos. R01MH113752 (including 3R01MH113752-0451, 3R01MH113752-0351, and 3R01MH113752-02S1) and R34MH106770, awarded by the National Institutes of Health. The Government has certain rights in the invention.

BACKGROUND

Computer-based methods and systems can be used for providing interventions, such as just in time interventions, to individuals suffering from mental health disorders, such as anxiety. For example, social anxiety disorder (SAD) is one of the most prevalent mental disorders, affecting 12.1% of the U.S. population at some point in their lifetime, resulting in serious impairment and a poorer quality of life. Yet, individuals with SAD often wait more than a decade before seeking treatment, if they ever do seek care, given that social avoidance is a core feature of social anxiety. This makes seeking in-person services very difficult, so there is a crucial need for scalable, accessible treatments that are delivered outside of therapy and can be integrated into daily life.

DETAILED DESCRIPTION

Overview

Just-in-Time Adaptive Interventions (JITAIs) can be delivered via mobile devices (e.g., smartphones), which can represent a promising method to not only increase access to cost-effective and acceptable mental health care, but also to tailor in-the-moment interventions to best match the specific context of the individual and their personal stressors, and determine when the individual is most likely to benefit from the intervention. The interventions may include intervention content that is delivered at a specified time. A specified time may be a specific time in the future and/or may be a time of a user's choosing.

Mobile sensing may be used to detect indicators of temporal phases of anxiety, indicators of emotion dysregulation, and personal context to optimize treatment. In some embodiments, a Context-Aware Micro-Interventions for Social Anxiety (CAMSA) system can be used to target relevant contexts of social anxiety (e.g., when alone or under social threat) and deliver personalized interventions to reduce symptoms. For example, the CAMSA system may include sensor-rich mobile devices (e.g., smartphones, smartwatches) that can collect data on relevant features (e.g., type of anxiety, social context, physiological state) that identify an individual's state anxiety context, along with user-centered design of personalized micro-interventions for social anxiety. The CAMSA system may be a microdose intervention content delivery system as described herein. Additionally or alternatively, the CAMSA system can be a recommendation system. These systems can include physiological biomarker sensors that can be used to generate intervention content. For example, intervention content may be generated in response to a physiological biomarker exceeding a physiological threshold. The physiological markers may be indicative of a user's physiology. Physiology may refer to a state of mental or physical health of a person. If a person's physiology is not functioning as expected, this may be indicative of a health-related condition. The CAMSA system can be deployed to socially anxious individuals to identify biomarkers of state anxiety at different temporal phases and optimize features to personalize the content and timing of the intervention delivery, and be readily adapted for a range of mood and anxiety conditions.

Just-in-time adaptive intervention (JITAI) is an intervention that can be configured to provide an appropriate type and/or amount of support at an appropriate time by adapting to an individual's changing internal and contextual state. Identifying the right moment (e.g., because of the need or opportunity for an intervention) and identifying what type of intervention to provide to fit that moment can be valuable to a user. This type of just-in-time intervention design, also known as Ecological Momentary Interventions (EMI), can be characterized by the use of mobile devices equipped with one or more sensors to collect data related to a person's context (e.g., internal and/or external). This area is broadly called mobile health.

Millions of Americans will suffer from an anxiety disorder and/or other health-related conditions over their lifetime. While some patients who are able to access mental healthcare find relief from traditional treatment modalities (cognitive behavioral therapy, with or without medication), a substantial portion of those in treatment do not. Further, most people will not have the chance to receive a full dose of an evidence-based in-person treatment for anxiety, so there is great need to offer alternatives to in-person care (or adjuncts that could reduce the duration and costs of in-person care).

Embodiments described herein can include a web-based tool for helping delivery intervention for health-related conditions, such as general anxiety and negative thinking patterns, using a mobile application with embedded sensing that is readily tailored to different populations. The anxiety may be linked to social threats or work/school performance concerns, worries about health, COVID, or any of a broad range of conditions related to anxiety.

The system, such as a microdose intervention content delivery system, can provide microdosing and personal tailoring of training materials via a computing device (e.g., desktop computer, smart watch, smart phone, etc.). The system may embed state anxiety sensing to personalize the delivery of the microdoses. The digital health microdosing interventions can be personalized, engaging, adaptive, and sufficiently challenging to produce functional and measurable improvements. The system can address specific sub-populations of users (e.g., teenagers, college students, different forms of anxiety, cultural tailoring to meet the needs of diverse communities, etc.). The microsing interventions may be delivered to a user device, which may be signaled via an intervention notification.

In some embodiments, the system can determine an efficacy of the intervention content and/or generate an indication of the efficacy. For example, the system may test various biomarkers after intervention content has been delivered. An intervention may be considered effective if a particular biomarker is improved (e.g., lowered) beyond a biomarker threshold in response to the intervention. For example, an updated biomarker of a physiological biomarker may be effective if the particular physiological biomarker drops below a biomarker threshold. If a biomarker is within (e.g., below) a biomarker threshold, this can indicate that the user's physiology is not indicative of a health-related condition.

Social anxiety disorder (SAD) is one of the most prevalent mental disorders, affecting 12.1% of U.S. individuals at some point in their lifetime. SAD is characterized by fear and avoidance of socially evaluative situations, often leading to devastating consequences for the affected individual and placing considerable economic burden on society at large. In addition to being associated with social impairment and a poorer quality of life, the experience of SAD has been shown to undermine educational achievement, predict significantly lower earned wages and workplace productivity, and be associated with taking more days off of work. Thus, SAD is both severely distressing to the individual and poses a sizable, indirect economic cost in terms of lost worker productivity, absenteeism, and withdrawal from social marketplace spending. The systems described herein can allow for an examination of extreme reactivity to social threats (elucidating how this normative response system can malfunction). The system can receive and/or analyze a user response. The user response may be responsive to the intervention itself and/or to an alert, such as an intervention notification.

Despite the extent of emotional and financial suffering imposed by SAD, individuals with SAD endure an average of 15 to 20 years of symptoms before initiating treatment. While there are many barriers to seeking psychological services in general (e.g., time), there appears to be a distinct pattern of treatment barriers in the case of SAD. Namely, individuals with SAD (vs. those without SAD) are more likely to report fear about what others might think or say as barriers towards seeking treatment. Given social avoidance is a core feature of social anxiety, attempts at reducing these treatment barriers can mean that the mere act of presenting for in-person, traditional therapy may be prohibitively frightening for some individuals. The tendency to avoid situations that engender anxiety is pervasive across the anxiety disorders so, to some extent, avoidance of seeking in-person care can come up for a broad range of anxious persons. Thus, translating active treatment mechanisms into actionable intervention approaches that step out of the therapy room and into daily life can be beneficial.

Mobile technology can provide a computer-implemented method to not only increase access to affordable and approachable mental health care for anxious individuals, it can also offer unique possibilities to tailor in-the-moment interventions to best match the specific context of the individual and their stressors, and/or can determine when the individual is most likely to benefit from the intervention (an approach that is often referred to as Just-in-Time Adaptive Interventions). Delivering personalized, context-relevant treatment for people when and where they most need it may foster improvements in quality of life for more people, more quickly. In some embodiments, the systems described can include sensor-rich smartphones and smartwatches to passively evaluate patients' contextual states (e.g., social context) and signatures of SAD symptoms from the continuous sensor streams, and/or design contextual multi-armed bandit models to improve the timing of interventions based on users' context and SAD symptoms.

Embedded sensors in smartphones and/or other wearable devices can be harnessed to passively capture information related to users' personal and environmental factors (e.g., current location as indicated by GPS) and behaviors (e.g., movements as indicated by accelerometer features), while also reducing participant burden. Machine learning may be used to infer personal factors, such as affective state (e.g., stress, anxiety, and sadness) and psychosocial impacts of living with a mental health condition). For example, a model may be trained using affective states or other personal factors from a plurality of users. The model, once trained, may be implemented within the system to identify a personal state of a user.

JITAIs can improve health outcomes, such as in diet, physical activity, stress, substance abuse, and addiction. JITAIs can be beneficial for anxious individuals. The system may use learning methods or other computer-implemented methods such as multi-armed and contextual bandits to improve intervention options, as well as reinforce learning for mobile health JITAIs.

Anxiety, including SAD, is characterized by a negative interpretation bias, or greater likelihood to interpret ambiguous situations as threatening, and this core feature can be an important mechanism for maintaining anxiety symptoms. Cognitive Bias Modification for Interpretation (CBM-I) can be used to reduce this bias and reduce symptoms without requiring the constraints of traditional one-on-one or in-person therapy. During CBM-I, participants may gain repeated practice assigning non-threatening interpretations and considering situations from more than one perspective, which may increase cognitive flexibility and reduce anxiety symptoms.

While delivering a standard (e.g., lengthy) set of CBM-I training scenarios on a semi-fixed time frame has been effective in some studies, it has not always promoted symptom change and these effects can be strengthened. In particular, the system may provide brief doses (termed microdoses) of CBM-I scenarios to match the individual's context (e.g., timing, location, social situation) and current concerns. This timing and type of dosing may strengthen the effects of therapy delivered via a computing device (e.g., mobile device, desktop computer). JITAIs can be used as a vehicle for personalized CBM-I delivery within mobile sensing for monitoring and treating anxiety.

Figure 1:
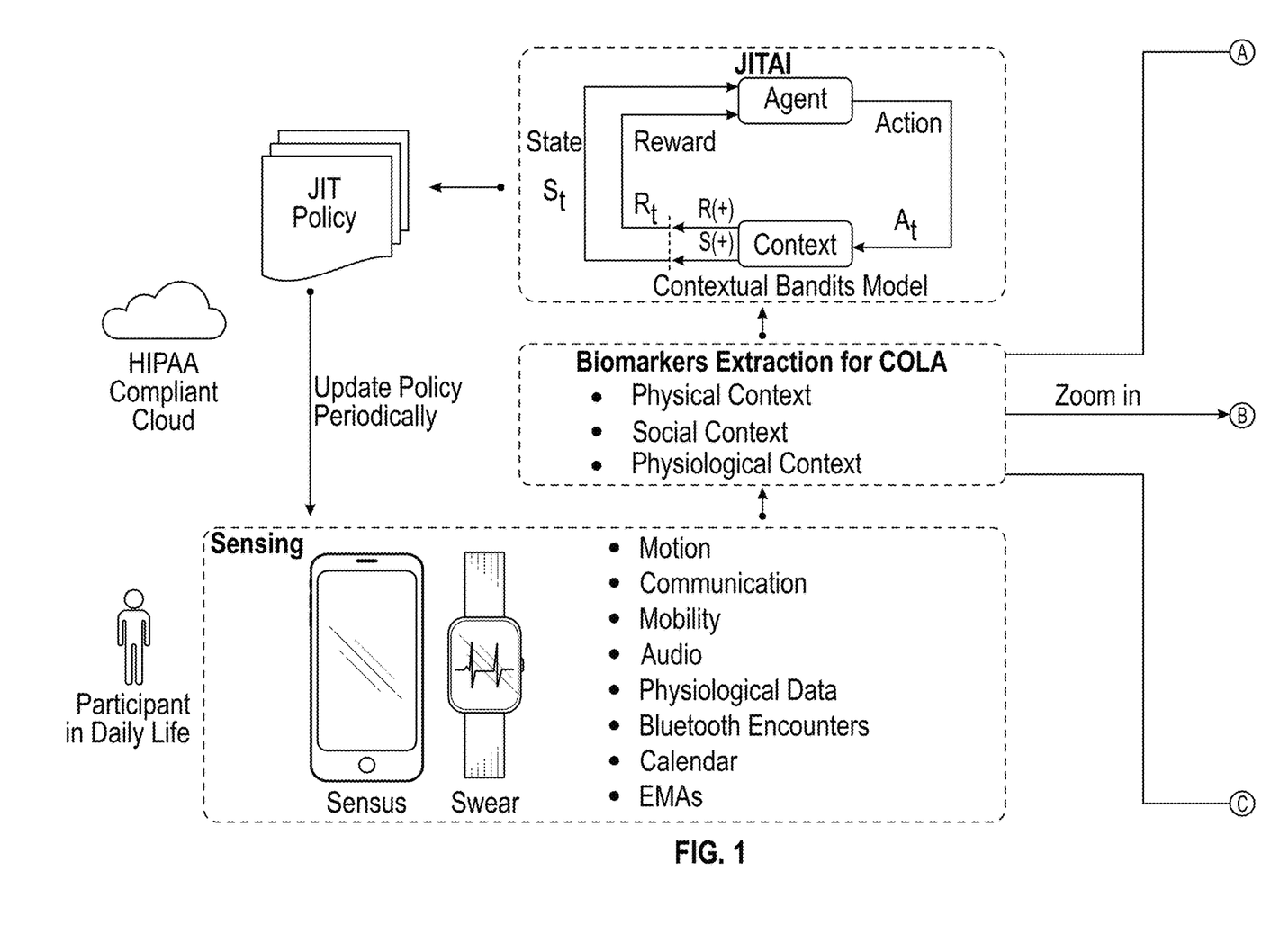
FIG. 1 shows an example CAMSA sensing system overview.

FIG. 1 depicts a sample embodiment of the proposed CAMSA sensing system for social anxiety as an example of how the sensing and intervention delivery system can be applied. The system can collect multimodal sensor data for health (e.g., biomarker parameters described herein). The system may provide automatic deployment of Ecological Momentary Assessments (EMAs) and/or interventions on a schedule, at random times, based on user demand, or using sensor triggers (e.g., when audio magnitude exceeds a threshold). One or more mobile devices, such as a smartwatch, can collect multimodal sensor data of users in their natural environments.

The system can provide intervention delivery based on user context. For example, the system can sense a user's context (e.g., semantic location and activity) and/or use a trained machine learning model (e.g., running in the cloud) to deliver intervention dosing.

The system may include statistical, machine learning, and/or signal processing methods to explore the interconnections between state and trait mental health measures (e.g., affect, stress, social anxiety, depression symptoms) and/or passive sensor data collected from smartphones and wearables. The system can identify digital biomarkers that characterize anxious individuals by fusing multiscale data streams from smartphone sensors. For example, micro-level movement patterns (e.g., movements detected via accelerometer sensor) can differ by anxiety level. These behaviors may vary by communication media (e.g., phone call vs. text, etc.) and/or semantic location. The system may identify a relationship between trait anxiety (e.g., social anxiety symptoms), state affect, social isolation in users, and/or other actual or possible states of anxiety to determine when and/or what kind of intervention should be delivered. The system may (e.g., using one or more sensors) identify when and where people with anxiety use different emotion regulation strategies, identifying systematic variance across spatiotemporal features and/or anxiety level. A user's response to an EMA may be influenced by several contextual factors (e.g. location, social context, etc.) that predict compliance. The user interaction can provide helpful feedback to the system to allow the system to determine a state of the user's physiology.

The system may be adaptive in identifying how anxiety biomarkers communicate details about the user. Anxiety biomarkers can include any combination of one or more of physical biomarkers, social biomarkers, and/or physiological biomarkers. The anxiety biomarkers can vary during different stages of anxious episodes (e.g., before, during, and after). Users may wear a smartwatch with a user interface to collect physiological, audio and/or motion data. Additionally or alternatively, the user may wear a wristband to collect other physiological data (e.g., skin conductance). These features can give the system an indication of the quality of the physiology of the user.

Figure 2:
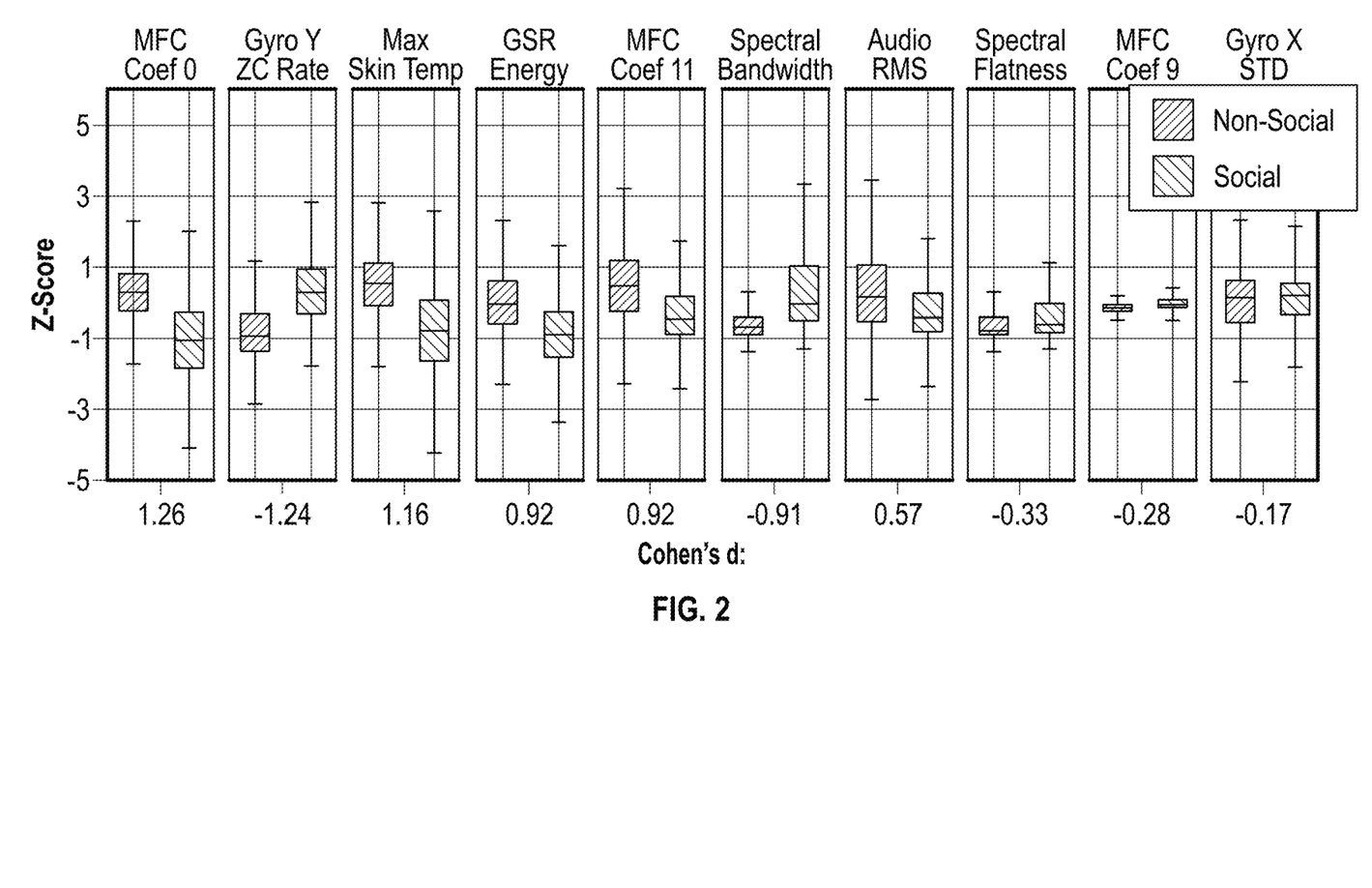
FIG. 2 shows example distributions of physiological features during non-social and social interactions.

The system may identify (e.g., sense, calculate, etc.) one or more of over 100 features from various sensors and inputs, such as an accelerometer, a gyroscope, ambient audio, photoplethysmography (PPG), electrodermal activity (EDA), temperature, and/or other inputs related to a user. Combinations of these features can be used to identify a users' physiological signals, motion features, and/or audio features during non-social vs. social interaction experiences. FIG. 2 shows example distributions of physiological features during non-social and social interactions.

In some embodiments, the system can use Long Short Term Memory (LSTM) to detect different features of the user's state and context. For example and without limitation, the system can detect temporal stages tied to threatening experiences (e.g., anticipatory vs. concurrent vs. post-event), context tied to these experiences (e.g., being alone vs. in a dyad or group). Accordingly, the system can identify both the real time occurrence of social interactions as well as the different temporal stages within each anxious episode.

Figure 3:
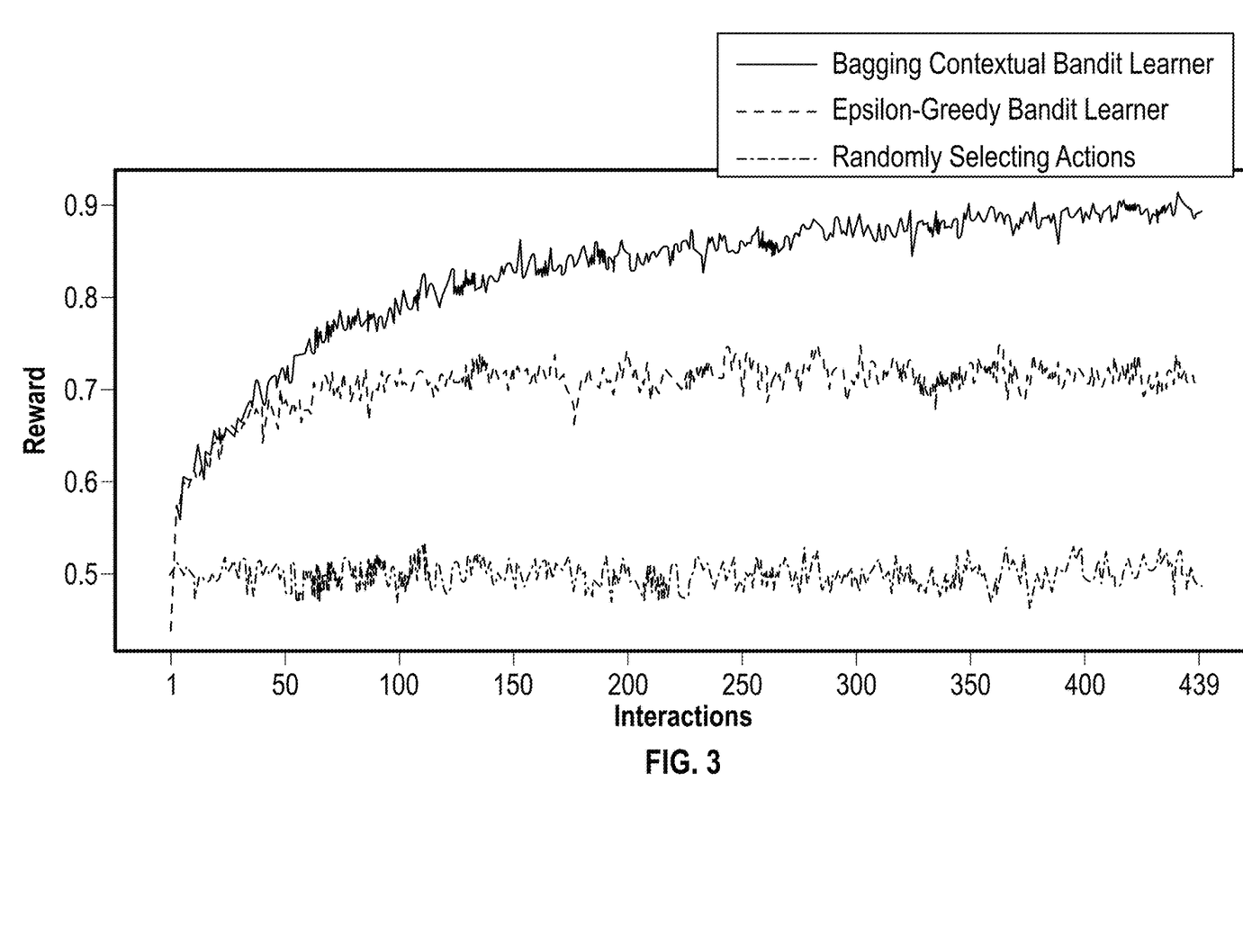
FIG. 3 shows the effectiveness of certain embodiments in identifying whether an individual is in a social situation or by themselves.

FIG. 3 shows the effectiveness of certain embodiments in identifying whether an individual is in a social situation or by themselves. A correct prediction is given a reward of 1 and an incorrect prediction is given a reward of 0. The plotted performance is the average reward of each algorithm used by various embodiments herein. Additionally or alternatively, the system may be able to detect anxious states of users from voice samples. Accordingly, systems and methods described herein can use contextual bandits to effectively identify recommended interventions for anxiety or possible states of anxiety. Identifying emotion regulation strategies for anxiety management can be described as a multi-armed contextual bandit problem using mobile sensing data in an offline learning algorithm and created a contextual emotion regulation recommendation system using mobile sensing data generated from users. The learning algorithm can be part of the recommendation algorithm.

The system can use a multivariate logistic regression as the value function approximator that maps contexts to rewards for each anxiety intervention strategy using a doubly robust estimator. The estimator can serve as a recommender or recommendation system for which kind of intervention is to be provided, based on the inputs from the various sensors. Based on the inputs, the recommendation system can improve anxiety management. For example, the contextual recommender system can vary in what intervention it recommends based on the participant's context. The recommender can identify different microdose (e.g., brief and/or targeted dosing on a specific mechanism) interventions based on the mobile sensing data and/or on modeling from a machine learning model.

The system may implement CBM-I as the model for microdosing, and in some embodiments other interventions can also be supported by the system. CBM-I (interpretation bias change) can be effectively delivered via technology-based systems, such as those described herein, and may be easily modified to target a broad range of anxiety and other clinical problems for diverse populations as the content of the training scenarios can be readily altered.

Using mobile device (e.g., smartphones and/or smartwatches) sensory functionality, the system can collect in situ data about user's physical and/or mental states relevant to anxiety. The system may identify one or more of physical biomarkers (e.g., data from an accelerometer, a gyroscope, a GPS, etc.) using corresponding physical biomarker sensors, social biomarkers (e.g., data from an audio sensor, Bluetooth sensor, phone-usage sensor, calendar tracker, etc.) from corresponding social biomarker sensors, and/or physiological biomarkers (e.g., data from a photoplethysmography (PPG) sensor, an electrodermal activity (EDA) sensor, temperature sensor) from corresponding physiological biomarkers, and/or other biomarkers.

Physical biomarkers can include a user's acceleration, a user's orientation or user's pose, a user's location, a user's state of motion, and/or data descriptive of other physical aspects of a person. Example physical biomarker sensors include an accelerometer, a gyroscope, a GPS system, a distance sensor, a step counter, and/or some other physical biomarker sensor.

Social biomarkers can include audio data (e.g., a sound near the user), connection data indicative of device connection with and/or proximity to other devices, phone usage data, call data, calendar data, and/or other data descriptive of a social status of a person. Example social biomarker sensors include a call log, a text log, a calendar, a Bluetooth sensor, a microphone, and/or some other social biomarker sensor.

Physiological biomarkers can include a user's blood pressure, a user's pulse, a user's temperature, an electrical conductance of a user's skin, a user's skin moistness, a user's blood flow within a portion of a user's body, and/or other data descriptive of a user's physiology. Example physiological biomarker sensors include a PPG sensor, an EDA sensor, a thermometer, an optical sensor, an electrical resistance sensor, an electrical conductance sensor, and/or some other physiological biomarker sensor.

For example, the system may collect physical biomarker data from a physical biomarker sensor, such as an accelerometer and/or gyroscope. The physical biomarker data such can include data from and/or may indicate physical activity like walking and driving, a proportion of time being active and/or sedentary (or sleeping), and/or other physical biomarker data. Physical inactivity may be related to anxiety or other forms of distress, which may further worsen symptoms. Low-level motion features, such as deviations in acceleration, can indicate anxiety. An individual's body language may vary across social interactions. These motion features may help reveal whether an individual has a particular motion pattern during anxious situations (e.g., shaking or twitching).

The system may include a GPS to sense other data, such as positional biomarkers or other physical biomarkers. For example, the system may sense semantic locations, location visit patterns, time associated with these visits (e.g., time spent at home), and/or other location-based (e.g., positional biomarker) data. As an example, highly socially anxious individuals may avoid social and public places where there are more opportunities for interacting with others. Additionally or alternatively, time spent at home and other locations can correlate with anxiety symptoms.

The system can identify social biomarker data from an audio sensor, Bluetooth sensor, phone-usage sensor, and/or calendar tracker. Audio features such as Mel-frequency cepstral coefficients (MFCCs), root mean square, centroid, zero-crossing rate, spectral bandwidth, spectral flatness, spectral rolloff, or other audio features can be monitored to help detect whether a person is in a social interaction. Additionally or alternatively, elevated stress during anxious episodes may alter some acoustic properties, such as tone and voice energy of a user, which can be captured by microphones or other audio sensors.

The system may include a Bluetooth sensor, phone-usage, calendar tracker, and/or other sensor to track calls and text messages. These features can help detect face-to-face and virtual social interactions that may trigger anxiety symptoms. The data may be correlated with expected appointment times in a calendar to estimate when the face-to-face interactions are occurring and/or their frequency.

The system may include a PPG sensor to track heart-rate variability features such as a standard deviation of RR intervals and/or respiration rates. Such physiological responses can be triggered by anxiety provoking stimuli such as evaluative social interactions (e.g., higher heart rates and respiration rates when talking to one's boss). The system may include an EDA sensor, which can measure peak rise time, amplitude, and/or energy etc. These physiological features can help detect whether a person is experiencing anxiety as it is shown that people with elevated anxiety states have more skin conductance fluctuations at rest and smaller responses to activating stimuli.

The system may include a temperature sensor to track changes in skin temperature. Stress may trigger peripheral vasoconstriction, causing a rapid, short-term drop in skin temperature.

Additionally or alternatively to collecting passive sensor data, self-report data may be collected via EMAs delivered on both smartwatches (micro-EMAs, including short questions such as "current anxiety level") and/or smartphones (longer questions such as "level of motivation to change one's thoughts and feelings").

In some embodiments, the system uses smart sensing functionality to minimize resource consumption. For example, the heart rate sensor may only be turned on when participants are wearing the device (e.g., watch). Additionally or alternatively, the audio sensor may only be turned on during specific contextual states in which participants are more likely to be experiencing stressful interactions (e.g., when the physiological data indicates a state of arousal and location or Bluetooth data suggest a social context is likely). The relevant contextual states can be learned through a combination of semi-controlled and "in-the-wild" human subject studies fusing multimodal data streams (e.g., location, time, and arousal) with data synced periodically (e.g., every 4 hours) to a secure server for analysis. Such data can be used to train a machine learning model for use by the systems described herein.

To understand how an individual's contextual data relate to symptoms of anxiety, the system may convert noisy sensor data to interpretable features (biomarkers) that can be used to understand when people are in need of interventions (see FIG. 1). To better personalize interventions and reach people at the most appropriate time(s), the system can target an individual's physical, social, and physiological contexts, and extract features using supervised and unsupervised machine learning to characterize anxiety states. As noted above, the system may identify various features that will be extracted from different sensing streams collected by mobile devices (e.g., smartphones and smartwatches) leveraging prior data to validate biomarker discovery methods.

To deliver personalized interventions at the most opportune moments, the system may identify the relevant physical contexts (e.g. home vs. work, walking) in which an individual is both willing and in need of an intervention. For example, parsing GPS to semantic locations using spatiotemporal clustering and geodatabases, as well as custom and on-device activity recognition algorithms can allow the system to detect location and motion states relevant to state anxiety levels. The recognition algorithms can be part of the recommendation algorithm. The system may identify and/or specify a time for delivering (e.g., starting delivery of) the intervention. Such a time may be a specified time by a user and/or a random time.

To detect when participants are vulnerable to state anxiety and deliver an effective intervention based on context, it can be valuable to build robust methods to passively recognize social interactions from smart device data. The system may be configured to identify one or both of two types of social interactions: virtual and face-to-face. Virtual interactions may be detected by using call and SMS metadata collected from smartphones. Additionally or alternatively, face-to-face interactions may be detected based on supervised machine learning models that fuse multimodal data from audio signals, Bluetooth encounters, GPS, calendar, and motion data (e.g., as captured from smartwatch accelerometer and gyroscope sensors). The system may fuse multiple streams of data from mobile devices, such as smartwatches and phones, to detect when social interactions are occurring. For example, participants may have particular gesture patterns indicative of social interactions (e.g., body language during a speech). Audio features can be extracted to differentiate between speech, silence, and non-live-speech noise (e.g., sounds from a radio or television). Audio segments that include speech have a higher intensity (or acoustic energy) than the rest of the signal (which in theory contains the background noise). Features like energy, the Spectral Flatness Measure (SFM db=10 $\log_{10}(G_m=A_m)$, where $A_m$ and $G_m$ are arithmetic and geometric means of speech spectrum respectively), and the most dominant frequency components of each speech frame spectrum can be extracted because they were previously demonstrated to be very useful in discriminating between speech and non-speech in audio signals.

The autonomic nervous system (ANS), when affected by stressful stimuli such as anxious social interactions, secretes stress hormones such as cortisol and adrenaline within the blood vessels. This causes the activation of sympathetic nerves and inactivation of parasympathetic nerves, producing detectable physiological responses.

The system may use physiological biomarker sensors to detect and/or extract physiological biomarkers from a user. The system can use these physiological biomarkers to characterize state anxiety. The physiological biomarkers can include a heart rate, a heart rate variability (HRV), and/or respiration rates. These physiological biomarker may be obtained from physiological biomarker sensor, such as a wearable device or a portion thereof. For example, a physiological biomarker sensor can include a smartwatch photoplethysmography (PPG) sensor.

These physiological biomarkers can be effective at indicating and/or tracking changes in ANS, predicting stress levels, and/or indicating another health-related condition of a person (e.g., user). For example, if a physiological biomarker exceeds a physiological threshold, then further action may be taken. The further action may include taking additional measurements from a different or the same biomarker sensor (e.g., a physiological biomarker sensor). Further action may additionally or alternatively include generating and/or transmitting intervention content. A physiological threshold may include a number of beats per minute, a respiratory rate, a degree of change in a heart rate, a degree of change in a respiratory rate, and/or some other parameter. A threshold number of beats per minute (bpm) that indicates a health-related condition may be about 80 bpm, about 90 bpm, about 100 bpm, about 110 bpm, about 120 bpm, any value therein, or fall within a range having endpoints therein. Health-related conditions can include anxiety, depression, and/or other conditions described herein.

Physiological biomarker sensors may have limitations that need to be accounted for. For example, a PPG signal is very sensitive to motion artifacts, which may lead to poor HRV estimation if false peaks are detected, the signal may first be denoised using adaptive filters. The system can use the automatic multiscale-based peak detection (AMPD) algorithm to enhance HRV estimation. This algorithm may improve the accuracy of the PPG and/or other physiological biomarker sensors. This algorithm may be part of a recommendation algorithm.

State anxiety can also cause rapid breathing or hyperventilation. Respiration rates can be estimated by first extracting the respiratory signals from the PPG signals using a band-pass filter, and/or by applying an auto-regressive spectral analysis to extract periods of respiration that are correlated with state anxious arousal.

Motion and/or audio-derived metrics can be captured to characterize other physiological symptoms of state anxiety, including shaky hands, shaky voice, etc. For example, high (vs. low) anxious individuals may exhibit more variation in fine grained motion as measured by smartphone accelerometers indicating nervousness or fidgeting before making phone calls. Accordingly, the system may identify differentiating patterns of movement during and around stressors. Additionally or alternatively to movement, stress induced by various types of situations can lead to vocal signal modifications in both linguistic and paralinguistic features. The system may extract paralinguistic features, such as tone, that may be approximated using pitch, energy, and Mel-frequency cepstral coefficients (MFCCs), which can be meaningful elements in the evaluation of state anxiety. Additionally or alternatively, the system may extract language features by converting speech to text data (e.g., using a remote computing device via a data interface), then extracting semantic features indicative of state anxiety. The system can extract word embedding features that can describe structural organization of words in text messages. Example of features include: 1) frequency-based embedding methods such as Count Vector, Term Frequency-Inverse Document Frequency (TF-IDF), and/or 2) prediction-based word embedding techniques that leverage neural networks to establish probabilistic relationships between words (e.g., word2vec). The system can additionally or alternatively extract lexical features such as Linguistic Inquiry and Word Count (LIWC), which is one of the most popular lexical feature extraction methods in the context of psychometric analysis of textual data.

The system can use the biomarkers described herein to understand the dynamics of anxiety in natural environments and how the signatures fluctuate across different stressors. By identifying biomarkers of state anxiety of users, the system can learn which markers align well with subjective distress and how these markers can detect early signals of anxiety difficulties, long before they would be reported to a therapist in a weekly session. After an intervention has been provided, the system may sense updated biomarkers to determine whether the intervention was effective and/or to determine a level of efficacy. The psychology field can benefit from ecologically valid, low burden ways to catch early warning signs of increasing symptoms and this mobile sensing system starts to make that wish a reality.

The system can identify how biomarkers relate to different experiences of state anxiety (e.g., subjective negative affect and fears of negative evaluation related to social interactions), and how those features fluctuate before, during, and after anxiety provoking situations.

The JITAI CBM-I delivery model used by the system may, for example, be based on the contextual multi-armed bandit recommendation algorithm instead of a full RL algorithm (e.g., Q-learning) to mitigate the reliance on large training data and on the assumption that the state space is perfectly known. This problem is abstractly modeled as the tuple (X, A, R, $\overline{\mathcal{P}}$) where X is the set of all possible contexts, A is the set of all possible actions, R= $\mathbb{R}^A$ is the set of possible reward functions and $\overline{\mathcal{P}}$: X×R$\hookrightarrow$[0, 1] is the joint probability of observing a context x∈X with a reward function r∈R. The solution to this problem is any $\pi^* \in A^X$ satisfying $\pi^*(x)$=arg $\max_{a \in A} \int_R r(a) \, \overline{\mathcal{P}}(x, dr)$.

To apply this idealized model, the following definitions have been made: The set X has been defined as the current state of the world. This includes environmental (e.g., location and noise level), temporal (e.g., time of day and day of week) and psychological (e.g., mood and awareness) factors. Because perfect knowledge of x∈X is not possible, a set of features have been defined $\phi: X \rightarrow \mathbb{R}^n$ that we can observe when given any x∈X. The set A has been defined to contain two actions: send intervention, hold intervention. This definition means that our model will only be concerned with the timing of interventions. The content of the interventions will be determined by briefly, explicitly asking users (or "participants") what domain, if any, of anxiety they are currently experiencing. The set R is still defined as $\mathbb{R}^A$. What remains to be defined is how r∈R will be "observed". This will be done after an action has been selected. In other words, r∈R is such an r that satisfies r(a), where e represents the user's feedback on the effectiveness of the intervention's timing (with 1 being poor and 5 being good).

$$r(a) = \begin{cases} e/5, & (a = \text{send}) \text{ and (participant responds)} \\ 0.0, & (a = \text{send}) \text{ and (participant doesn't respond)} \\ 0.0, & (a = \text{hold}) \text{ and (participant requests)} \\ 0.5, & (a = \text{hold}) \text{ and (participant doesn't request)} \end{cases}$$

The above model represents a single decision point. When implemented, this model can be consulted at a set interval (e.g., once every 30 minutes) to determine if the current context warrants an intervention. In addition to the set interval, there can also be a minimum separation between interventions (e.g., once an intervention is sent, another will not be sent for at least one hour). Finally, it should be noted that the contextual bandit problem is not known to have a single optimal solution with constraints that are observed in the real world. This challenge is driven by two characteristics of the problem: exploration versus exploitation and non-stationary system dynamics. Providing more information on how to effectively manage these challenges in health applications can be a benefit of systems described herein.

In some embodiments, users (e.g., participants) may be able to request an intervention at any time regardless of the model's decision. The content of CBM-I micro-interventions can be personalized based on both the temporal stage of anxiety and the nature of the stressor. The flow that defines the content of the training materials may be dictated using a decision rule model, such as the one above. When the contextual bandit model chooses to deliver an intervention, the decision rule models may be solicited to define the content of the intervention based on participant's context. During a microdose intervention delivery, users may be asked about the timing of the event and the type of stressor. For the latter question, they may first be prompted to identify the broad category of stressor from a brief list (e.g., social interaction with friends, academic stressor, etc.), and then using a branching logic they may be presented with a list of events to select from within the broad category. For example, if the person chose social interaction with friends, they could then be asked to choose among a list of options. For example, going out for coffee or a meal, going to a party, or another social interaction. The training materials assigned for the microdose may then be pulled from a large pool and matched to the specific stressor and its temporal stage. For example, a socially anxious person may experience an increase in anxious arousal and report that the stressor is a date that may be occurring later that night.

Some examples of personalized training scenarios can include incomplete audio messages and/or incomplete words. For example, a user may hear an audio message that is incomplete and provide a user interaction. The user interaction may include a user selection of a missing one or more letters, a missing one or more words, a missing one or more phrases, a missing one or more sentences, and/or some other user interaction. Additional examples are described below.

Scenario 1: Your partner asks you to go to an anniversary dinner that his/her company is holding. You have not met any of his/her work colleagues before. Getting ready to go, you think that the new people you will meet will find you fri_ndly. (Missing letter: e)

Comprehension question: Will you be disliked by your new acquaintances? (Answer: No)

Scenario 2: Some important people are visiting your office, and you are asked to present a project to them. On the day of the presentation, you arrange your slides and mentally prepare yourself. You think your performance will be evaluated as or_anized. (Missing letter: g)

Comprehension question: Will the visitors be unimpressed with your performance? (Answer: No)

In some embodiments, the scenarios can set up potentially anxiety provoking situations and some emotional ambiguity about how the situation will be resolved. The end of the scenario may be presented as a word fragment that the individual can complete to resolve the emotional ambiguity and be challenged to consider different ways of thinking about the situation. The resolutions may include outcomes that are benign or non-threatening so as to help shift an anxious individual away from the individual's tendency to assume the worst and make negative interpretations. Users may provide user responses, such as by filling in the missing letters to complete the word fragments. Additionally or alternatively a user response can include answering a comprehension question to check that they paid attention to the training materials and to check that the resolution of the emotional ambiguity was understood. In other embodiments, the user may fill in the final word themselves to generate a benign ending to the situation. Alternatively, the user may write their own scenario to apply the new way of thinking to a specific situation in their life. In some embodiments, the user may then reflect on a lesson learned from the story that can help them manage their anxiety (e.g., that others are not likely to judge them negatively). Additionally or alternatively, the user may receive a tip to further regulate their anxiety in their daily life and/or may get connected with another resource that can help them work on that difficult situation (e.g., a student who is anxious about their paper being poorly written could be connected with a tutor).

In other embodiments, training scenarios can use a longer format, which may present different possible endings to a potentially anxiety provoking situation to encourage the user to think about the situation in different ways. Alternatively or additionally, the situation may enhance the user's cognitive flexibility and/or perspective taking. They may read about endings to the situation that are positive, negative or neutral, and can focus on many aspects of the thoughts, feelings and behaviors that may come up in that situation. A user interaction with the device can then be transmitted to a remote computing device, such as a server. The remote computing device may be managed by a health care professional. Additionally or alternatively, the system may be able to determine an efficacy of the intervention content. For example, the system may determine that a physiological biomarker (e.g., heart rate, respiratory rate) has been reduced. Other measures of efficacy are possible with different types of biomarkers (e.g., social biomarkers, location biomarkers).

In some embodiments, microdoses with short scenarios may involve a set of scenarios tied to different aspects of assigning healthy meanings in the described situation. This may involve the system in some embodiments requesting a response from the participant to help personalize the intervention materials. The system may use machine learning models to model the timing of interventions using contextual bandit. Based on a user's response or lack-thereof, and/or based on reports after each micro intervention about the extent reading the stories at that time helped the participant think about stressful events in their life in a more flexible way, the recommendation system's models can be updated to adaptively improve when and under what conditions interventions are delivered. Effective JITAI CBM-I intervention may help users cope better with their anxiety and engage in potentially stressful interactions more frequently and effectively (e.g., reduce avoidance behavior). Using the biomarkers identified herein to understand how an individual's context changes as a function of the interventions, additionally or alternatively to physiological indicators to assess for a decrease in physiological reactivity or more rapid recovery after stressors, the system may be a powerful tool in delivering interventions.

Figure 4:
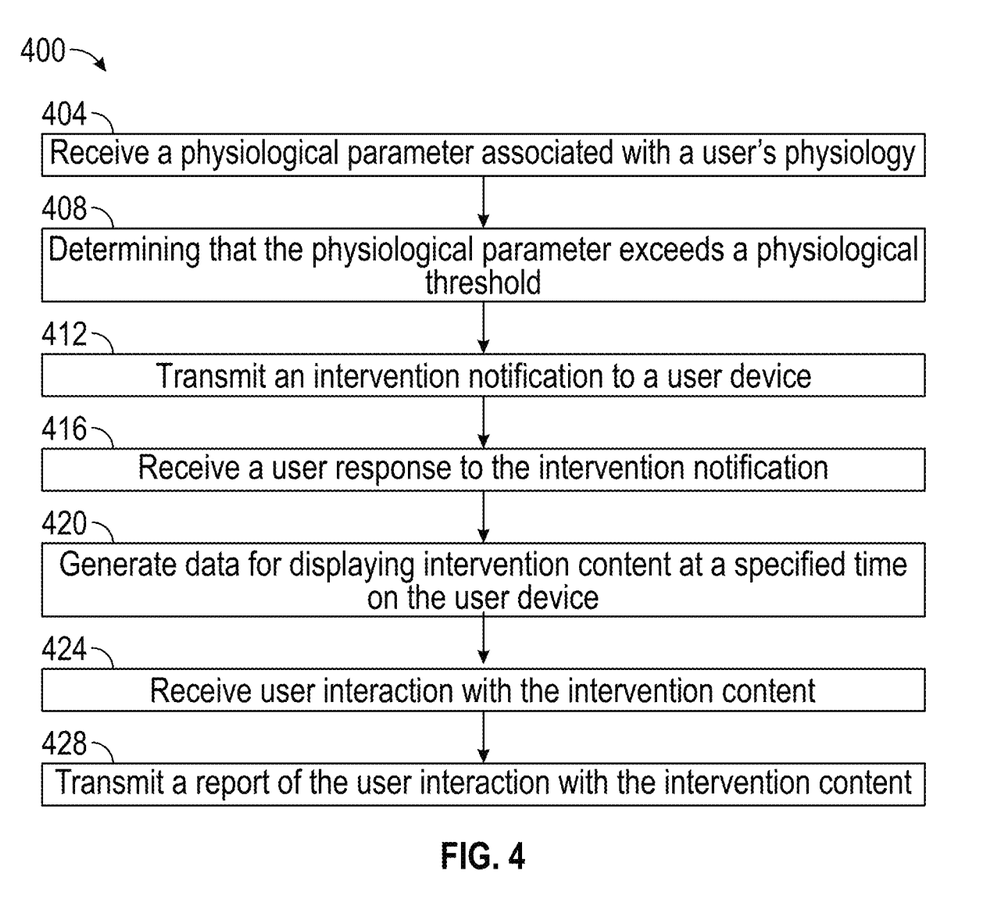
FIG. 4 shows an example method that may be performed by a system described herein to provide context-aware anxiety interventions.

FIG. 4 shows an example method 400 that may be performed by a system described herein to provide context-aware anxiety interventions. At block 404 the system can receive from a physiological sensor a physiological parameter associated with a user's physiology. At block 408 the system can determine that the physiological parameter exceeds a physiological threshold. The physiological parameter exceeding the physiological threshold may be at least partially indicative of a health-related condition (e.g., related to anxiety) associated with the user. At block 412 the system can transmit, based at least in part on the determination that the physiological parameter exceeds the physiological threshold, an intervention notification to a user device. At block 416 the system can receive (e.g., via the user device) a user response to the intervention notification. The user device may be a mobile device (e.g., smart watch or other smart wearable, smart phone) or a client terminal computing device. Receiving the user response to the intervention notification can include receiving the specified time associated with displaying the intervention content.

In response to the user response to the intervention notification, the system can at block 420 generate data for displaying intervention content at a specified time on the user device. The intervention content may be a microdose intervention content and may be configured to treat the health condition related to anxiety. At block 428 the system can receive, via the user device, user interaction with the intervention content. At block 428 the system can transmit (e.g., to a remote computing device) a report of the user interaction with the intervention content.

The system may also receive (e.g., from a biomarker sensor different from the physiological sensor) a biomarker parameter associated with at least one of: the user's state of motion, a user's location, an audio feature of sound near the user, a heart rate of the user, an electrical conductance of the user's skin, or a temperature of the user's skin. Based on this biomarker, the system may determine that the biomarker is at least partially indicative of the health condition related to anxiety. Transmitting the intervention notification to the user device may be further based on the determination that the biomarker parameter is at least partially indicative of the health condition related to anxiety. The biomarker sensor can include at least one of: an accelerometer, a GPS tracker, a microphone, an optical sensor, an electrical resistance sensor, an electrical conductance sensor, or a thermometer.

The system may be able to track the effectiveness of its intervention content by receiving an updated physiological parameter and, based on the updated physiological parameter, determine that the intervention content was effective. The physiological parameter can include any physiological parameter described herein, such as a heart rate of the user, an electrical conductance of the user's skin, and/or a temperature of the user's skin.

The intervention content can include images and associated audio messages. The audio messages may include incomplete audio messages and/or incomplete text messages that are missing one or more letters or words. A user may be asked to complete these incomplete messages. A recommendation system described herein of the system can recommend the specified time and/or type of intervention content.

Figure 5:
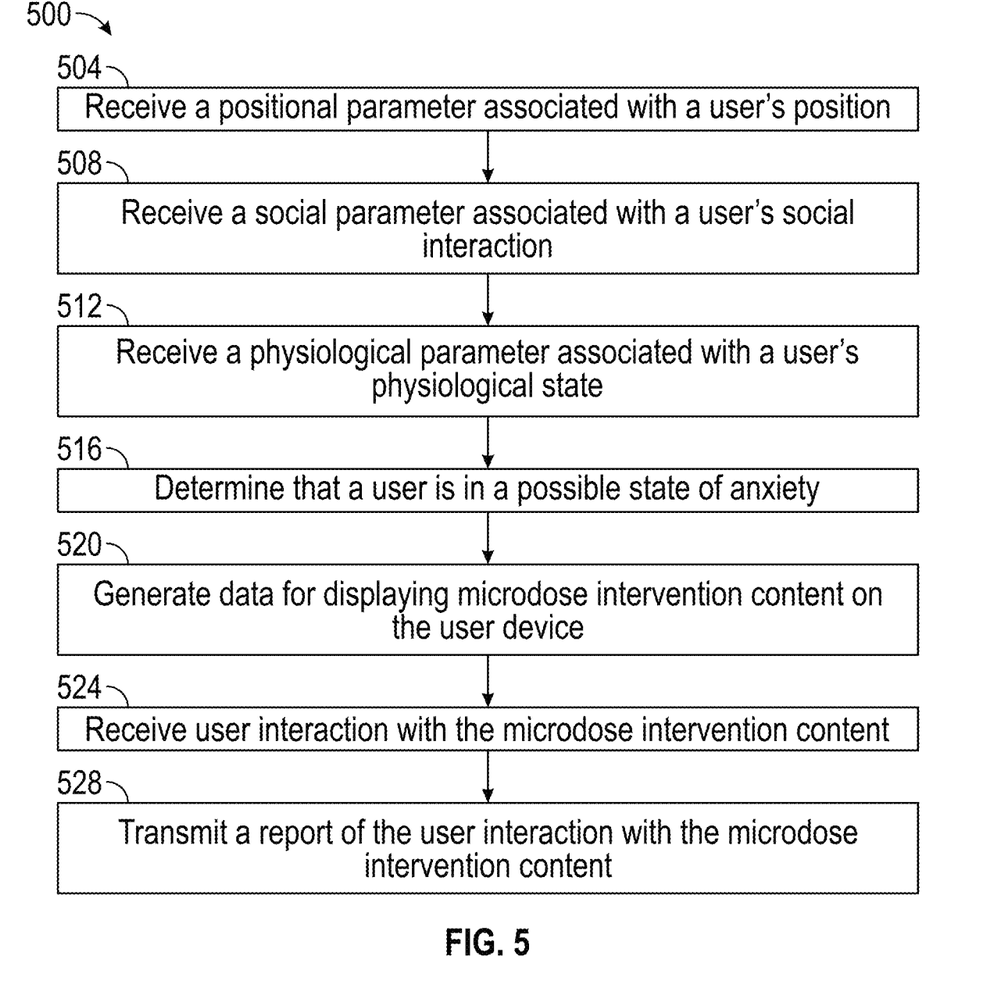
FIG. 5 shows another example method that may be performed by a system described herein to deliver microdose intervention content for anxiety.

FIG. 5 shows another example method 500 that may be performed by a system described herein to deliver microdose intervention content for anxiety. The system at block 504 can receive, from a physical biomarker sensor, a positional parameter associated with a user's position. At block 508 the system can receive, from a social biomarker sensor, a social parameter associated with a user's social interaction. At block 512 the system can receive, from a physiological biomarker sensor, a physiological parameter associated with a user's physiological state. At block 516 the system can determine, using a recommendation algorithm described herein, that a user is in a possible state of anxiety. At block 520 the system can generate, based at least in part on the determination that the user is in the possible state of anxiety, data for displaying microdose intervention content on the user interface. The microdose intervention content can be configured to help manage (e.g., treat) the anxiety. At block 524 the system can receive, via the user interface, user interaction with the microdose intervention content. At block 528 the system can transmit, to a remote computing device, a report of the user interaction with the microdose intervention content.

Additional Implementation Details

Various embodiments of the present disclosure may be a system, a method, and/or a computer program product at any possible technical detail level of integration. The computer program product may include a computer readable storage medium (or mediums) having computer readable program instructions thereon or therewith for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or computer executable instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computing device may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
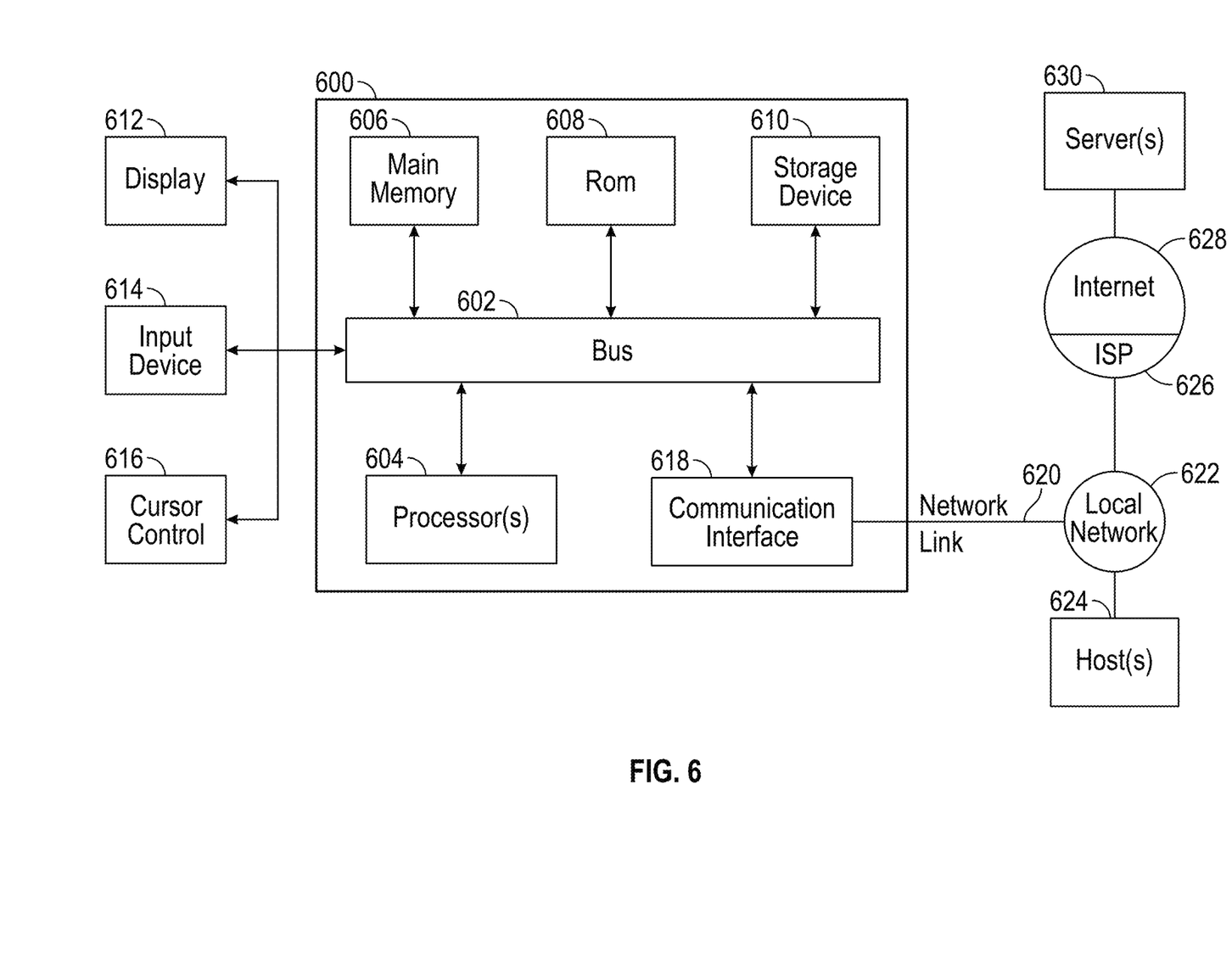
FIG. 6 is a block diagram illustrating one example of a computer system upon which various embodiments may be implemented.

For example, FIG. 6 is a block diagram that illustrates a computer system 600 upon which various embodiments may be implemented. Computer system 600 includes a bus 602 or other communication mechanism for communicating information, and a hardware processor, or multiple processors, 604 coupled with bus 602 for processing information. Hardware processor(s) 604 may be, for example, one or more general purpose microprocessors.

Computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

Computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 600 may include a user interface module to implement a GUI that may be stored in a mass storage device as computer executable program instructions that are executed by the computing device(s). Computer system 600 may further, as described below, implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more computer readable program instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

Various forms of computer readable storage media may be involved in carrying one or more sequences of one or more computer readable program instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method for using a physiological biomarker sensor to generate data for displaying intervention content at a specified time on a user device, the method comprising:
receiving, from a physiological biomarker sensor, a physiological biomarker associated with a user's physiology;
determining that the physiological biomarker exceeds a physiological threshold, wherein the physiological biomarker exceeding the physiological threshold is at least partially indicative of a health-related condition related to anxiety associated with the user;
transmitting, based at least in part on the determination that the physiological biomarker exceeds the physiological threshold, an intervention notification to the user device;
receiving, via the user device, a user response to the intervention notification and a specified time associated with displaying intervention content;
generating, in response to the user response to the intervention notification, data for displaying the intervention content at the specified time on the user device, wherein the intervention content is configured to treat the health-related condition related to anxiety;
transmitting, at the specified time, the data configured to treat the health-related condition related to anxiety to the user device;
receiving, via the user device, user interaction with the intervention content; and
transmitting, to a remote computing device, a report of the user interaction with the intervention content.

2. The computer-implemented method of claim 1, further comprising:
receiving, from a biomarker sensor different from the physiological biomarker sensor, a biomarker associated with at least one of: a user's state of motion, a user's location, an audio feature of sound near the user, a heart rate of the user, an electrical conductance of a user's skin, or a temperature of a user's skin; and
determining, based on the biomarker and at least partially on the determination that the physiological biomarker exceeds the physiological threshold, that the biomarker is at least partially indicative of the health-related condition related to anxiety;
wherein transmitting the intervention notification to the user device is further based on the determination that the biomarker is at least partially indicative of the health-related condition related to anxiety.

3. The computer-implemented method of claim 2, wherein the biomarker sensor comprises at least one of: an accelerometer, a GPS tracker, a microphone, an optical sensor, an electrical resistance sensor, an electrical conductance sensor, or a thermometer.

4. The computer-implemented method of claim 1, further comprising:
receiving, from the physiological biomarker sensor, a second physiological biomarker associated with a user's physiology;
determining that the second physiological biomarker does not exceed the physiological threshold; and
generating an indication of an efficacy of the intervention content.

5. The computer-implemented method of claim 1, wherein the physiological biomarker comprises at least one of: a heart rate of the user, an electrical conductance of a user's skin, or a temperature of the user's skin.

6. The computer-implemented method of claim 1, wherein generating the data for displaying the intervention content comprises generating images and associated audio messages.

7. The computer-implemented method of claim 6, wherein the audio messages comprise incomplete audio messages that are missing one or more letters or words.

8. The computer-implemented method of claim 7, wherein receiving the user interaction with the intervention content comprises receiving user selection of the missing one or more letters or words.

9. The computer-implemented method of claim 1, further comprising receiving, via a recommendation system, a recommendation of the specified time and a type of intervention content.

10. A microdose intervention content delivery system comprising:
a user interface configured to receive user interaction;
a plurality of biomarker sensors comprising a physical biomarker sensor, a social biomarker sensor, and a physiological biomarker sensor;
a computer readable storage medium having program instructions embodied therewith and a recommendation algorithm; and
one or more hardware processors in communication with the computer readable storage medium, and configured to execute the computer executable instructions to cause the computer system to:
receive, from the physical biomarker sensor, a physical biomarker associated with a user's location;
receive, from the social biomarker sensor, a social biomarker associated with a user's social interaction;
receive, from the physiological biomarker sensor, a physiological biomarker associated with a user's physiological state;
determine, using the recommendation algorithm and based on the physical biomarker, the social biomarker, and the physiological biomarker, that a user is in a possible state of anxiety;
generate, based at least in part on the determination that the user is in the possible state of anxiety, data for displaying microdose intervention content on the user interface, wherein the microdose intervention content is configured to treat the anxiety;
receive, via the user interface, user interaction with the microdose intervention content; and
transmit, to a remote computing device, a report of the user interaction with the microdose intervention content.

11. The system of claim 10, wherein the instructions, when executed by the one or more hardware processors are further configured to cause the computer system to:
receive a specified time associated with displaying the microdose intervention content.

12. The system of claim 10, wherein the instructions, when executed by the one or more hardware processors are further configured to cause the computer system to:
receive, from at least one of the plurality of biomarker sensors, a biomarker associated with at least one of: the user's state of motion, a user's location, an audio feature of sound near the user, a heart rate of the user, an electrical conductance of a user's skin, or a temperature of the user's skin.

13. The system of claim 10, wherein the plurality of biomarker sensors comprises at least one of: an accelerometer, a GPS tracker, a microphone, an optical sensor, an electrical resistance sensor, an electrical conductance sensor, or a thermometer.

14. The system of claim 10, wherein the instructions, when executed by the one or more hardware processors are further configured to cause the computer system to:
receiving, from the plurality of physiological sensor after transmitting the report of the user interaction with the microdose intervention content, an updated biomarker associated with the user;
determining that the updated biomarker does not exceed a biomarker threshold; and
generating an indication of an efficacy of the microdose intervention content.

15. The system of claim 10, wherein the physiological biomarker comprises at least one of: a heart rate of the user, an electrical conductance of a user's skin, or a temperature of the user's skin.

16. The system of claim 10, wherein generating the data for displaying the microdose intervention content comprises generating images and associated audio messages.

17. The system of claim 16, wherein the audio messages comprise incomplete audio messages that are missing one or more letters or words.

18. The system of claim 17, wherein receiving the user interaction with the microdose intervention content comprises receiving user selection of the missing one or more letters or words.

19. The system of claim 10, further comprising receiving, via the recommendation algorithm, a recommendation of a specified time and type of microdose intervention content.

20. A computer-implemented method for using a physiological biomarker sensor to generate data for displaying intervention content at a specified time on a user device, the method comprising:
receiving, from a physiological biomarker sensor, a physiological biomarker associated with a user's physiology;
determining that the physiological biomarker exceeds a physiological threshold, wherein the physiological biomarker exceeding the physiological threshold is at least partially indicative of a health-related condition related to anxiety associated with the user;
transmitting, based at least in part on the determination that the physiological biomarker exceeds the physiological threshold, an intervention notification to the user device;
receiving, via the user device, a user response to the intervention notification;
receiving, via a recommendation system, a recommendation of a specified time and a type of intervention content;
generating, in response to the user response to the intervention notification, data for displaying intervention content at the specified time on the user device, wherein the intervention content is configured to treat the health-related condition related to anxiety;
transmitting, at the specified time, the data configured to treat the health-related condition related to anxiety to the user device;
receiving, via the user device, user interaction with the intervention content; and
transmitting, to a remote computing device, a report of the user interaction with the intervention content.

* * * * *